US012172635B2

(12) United States Patent
Seong et al.

(10) Patent No.: US 12,172,635 B2
(45) Date of Patent: Dec. 24, 2024

(54) APPARATUS FOR FORWARD COLLISION-AVOIDANCE ASSIST-JUNCTION TURNING AND METHOD FOR THE SAME

(71) Applicants: HYUNDAI MOTOR COMPANY, Seoul (KR); Kia Corporation, Seoul (KR); HYUNDAI MOBIS CO., LTD., Seoul (KR)

(72) Inventors: Ki Seok Seong, Cheonan-si (KR); Sang Min Lee, Seoul (KR); Jun Yung Lee, Seongnam-si (KR); Hwan Seong Jo, Suwon-si (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 436 days.

(21) Appl. No.: 17/512,169

(22) Filed: Oct. 27, 2021

(65) Prior Publication Data

US 2022/0144255 A1    May 12, 2022

(30) Foreign Application Priority Data

Nov. 11, 2020   (KR) .................. 10-2020-0150474

(51) Int. Cl.
*B60W 30/09*    (2012.01)
*B60Q 9/00*    (2006.01)
(Continued)

(52) U.S. Cl.
CPC ............. *B60W 30/09* (2013.01); *B60Q 9/008* (2013.01); *B60W 10/20* (2013.01);
(Continued)

(58) Field of Classification Search
CPC ....... B60Q 9/008; B60W 10/20; B60W 30/08; B60W 30/09; B60W 30/0953;
(Continued)

(56) References Cited

U.S. PATENT DOCUMENTS

| 10,759,422 B2 | 9/2020 | You |
| 10,780,881 B2 | 9/2020 | You |

(Continued)

FOREIGN PATENT DOCUMENTS

| KR | 10-2017-0007925 A | 1/2017 |
| KR | 10-2018-0040014 A | 4/2018 |

*Primary Examiner* — Faris S Almatrahi
*Assistant Examiner* — Dana F Artimez
(74) *Attorney, Agent, or Firm* — MORGAN, LEWIS & BOCKIUS LLP

(57) ABSTRACT

An apparatus for forward collision avoidance assist-junction turning of a vehicle includes a sensor for acquiring at least one of a steering angle, a steering angle speed, or a yaw rate of a vehicle, or a size, a position, or a speed of an opposite target. A traveling path area for a left-turn or a right-turn is calculated by a controller based on the steering angle or the yaw rate of the vehicle. The traveling path area is then corrected by the controller based on at least a portion of the steering angle, the steering angle speed, or the yaw rate of the vehicle, or the size, the position, and the speed of the opposite target. A warning against the collision between the vehicle and the opposite target and a control operation to prevent the collision are performed based on the corrected traveling path area.

16 Claims, 8 Drawing Sheets

(51) Int. Cl.
 *B60W 10/20* (2006.01)
 *B60W 30/095* (2012.01)
 *B60W 30/14* (2006.01)

(52) U.S. Cl.
 CPC ...... *B60W 30/0956* (2013.01); *B60W 30/143* (2013.01); *B60W 2510/205* (2013.01); *B60W 2520/14* (2013.01); *B60W 2540/18* (2013.01); *B60W 2554/4041* (2020.02); *B60W 2554/4042* (2020.02); *B60W 2554/80* (2020.02)

(58) Field of Classification Search
 CPC ........... B60W 30/0956; B60W 30/143; B60W 30/18145; B60W 30/18159; B60W 40/02; B60W 40/114; B60W 50/14; B60W 2050/143; B60W 2510/205; B60W 2520/14; B60W 2540/18; B60W 2554/40; B60W 2554/404; B60W 2554/4041; B60W 2554/4042; B60W 2554/80; B60W 2720/24
 See application file for complete search history.

(56) References Cited

U.S. PATENT DOCUMENTS

| | | | |
|---|---|---|---|
| 2018/0024564 A1* | 1/2018 | Matsuda | G08G 1/052 701/25 |
| 2019/0118809 A1* | 4/2019 | Niino | B60T 8/17558 |
| 2020/0282997 A1* | 9/2020 | Ueda | B60W 30/18163 |
| 2021/0197807 A1* | 7/2021 | Park | B60W 30/095 |

* cited by examiner

<CASE OF HOST VEHICLE STEERING
ANGLE/ROTATIONAL ANGLE HAVING LARGE VALUE>

<CASE OF HOST VEHICLE STEERING
ANGLE/ROTATIONAL ANGLE HAVING SMALLER VALUE>

APPARATUS FOR FORWARD COLLISION-AVOIDANCE ASSIST-JUNCTION TURNING AND METHOD FOR THE SAME

CROSS-REFERENCE TO RELATED APPLICATION

This application claims the benefit of priority to Korean Patent Application No. 10-2020-0150474, filed in the Korean Intellectual Property Office on Nov. 11, 2020, the entire contents of which are incorporated herein by reference.

TECHNICAL FIELD

The present disclosure relates to an apparatus for forward collision-avoidance assist-junction turning and a method for the same, and more particularly, relates to an apparatus for forward collision-avoidance assist-junction turning through computation of a travelling path area, and a method for the same.

BACKGROUND

Forward Collision-Avoidance Assist-Junction Turning (FCA-JT) is a function of assisting braking, when the host vehicle turns left at a junction (or intersection), to prevent a host vehicle from colliding with an opposite vehicle traveling in an opposite direction. This is a technology to sense a vehicle having a collision risk through a front camera or a front radar installed in the vehicle, and to automatically control a brake, thereby preventing collision.

Recently, there has been developed a technology of generating a collision probability map by compensating for an error of a sensor to measure a relatively physical value, thereby enhancing the precision when sensing a collision risk. However, even though a lower collision risk is shown, a sensitive warning or a sensitive control operation is performed due to the limit of the sensor, which makes a driver bothering.

Accordingly, there has been developed a technology of more exactly determining the collision risk with the opposite vehicle and of performing the collision avoidance control only if necessary, thereby resolving the bothering of the driver while enhancing the safety of the driver, in the FCA-JT.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides an apparatus for forward collision avoidance assist-junction turning, capable of reducing a sensitive warning or a sensitive control operation by correcting a travelling path area, and a method for the same.

Another aspect of the present disclosure is to provide an apparatus for forward collision avoidance assist-junction turning, capable of providing an environment in which a driver focuses only on driving, as a sensitive warning and a sensitive control operation are reduced by correcting a travelling path area, and a method for the same.

Another aspect of the present disclosure is to provide an apparatus for forward collision avoidance assist-junction turning, capable of more exactly sensing a collision risk, based on a speed, a position, and a size of an opposite vehicle, and a method for the same.

Another aspect of the present disclosure is to provide an apparatus for forward collision avoidance assist-junction turning, capable of more exactly sensing a collision risk by correcting a travelling path area, based on a steering angle, a steering angle speed of a vehicle, and a yaw rate of a vehicle, and a method for the same.

Another aspect of the present disclosure is to provide an apparatus for forward collision avoidance assist-junction turning, capable of issuing a warning or performing a control operation to prevent an accident of a driver, by more exactly sensing a collision risk with an opposite vehicle, and a method for the same.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for forward collision avoidance assist-junction turning, may include a sensor to acquire a steering angle and a yaw rate of a vehicle having a forward collision avoidance assist-junction turning (FCA-JT) function, and a position of an opposite target that is traveling in an opposite direction to the vehicle, and to acquire at least one of a steering angle speed of the vehicle, or a size or a speed of the opposite target, and a controller to calculate a travelling path area for a left-turn or a right-turn of the vehicle based on the acquired steering angle and the acquired yaw rate, correct the travelling path area based on at least one of the steering angle, the steering angle speed, or the yaw rate of the vehicle, or the size, the position, or the speed of the opposite target, and output a warning against a collision between the vehicle and the opposite target or perform a control operation to prevent the collision, based on the corrected travelling path area and the position of the opposite target.

According to an embodiment, the sensor may include a steering angle sensor to acquire the steering angle and the steering angle speed of the vehicle, and a yaw rate sensor to acquire the yaw rate of the vehicle.

According to an embodiment, the opposite target may include at least one of an opposite vehicle, a bicycle, or a pedestrian.

According to an embodiment, the controller may correct the travelling path area, by calculating an area to be removed from the travelling path area based on the steering angle, the steering angle speed, and the yaw rate.

According to an embodiment, the controller may calculate a first length and a second length proportional to a sum of a rate of change in the steering angle, a rate of change in the steering angle speed, and a rate of change in the yaw rate, and calculate a right triangle, which serves as the area to be removed, having two sides including a first line segment, which is positioned on a straight line linking a first point to a second point and has the first length and a second segment, which is perpendicular to the first line segment, extends in a direction opposite to a forward direction of the vehicle from an inner end of the first line segment, and has the second length, in which the first point is positioned at an end, which is in the forward direction of the vehicle, of an inner boundary line of the travelling path area, and the second point is positioned at an end, which is in the forward direction of the vehicle, of an outer boundary line of the travelling path area, to correct the travelling path area.

According to an embodiment, the controller may calculate a first length and a second length proportional to a sum of a rate of change in the steering angle, a rate of change in the steering angle speed, and a rate of change in the yaw rate, which are applied with weights, and calculate a right triangle, which serves as the area to be removed, having two sides including a first line segment, which is positioned on a straight line linking a first point to a second point and has the first length and a second segment which is perpendicular to the first line segment, extends in a direction opposite to a forward direction of the vehicle from an inner end of the first line segment, and has the second length, in which the first point is positioned at an end, which is in the forward direction of the vehicle, of an inner boundary line of the travelling path area, and the second point is positioned at an end, which is in the forward direction of the vehicle, of an outer boundary line of the travelling path area, to correct the travelling path area.

According to an embodiment, the controller may calculate the first length and the second length, based on at least one of the speed, the size, or the position of the opposite target.

According to an embodiment, the controller may correct the travelling path area, based on a width of the travelling path area, which is calculated by adjusting an inner boundary of the travelling path area outward based on at least one of the speed or the position of the opposite target, or the steering angle, or the yaw rate.

According to an embodiment, the controller may correct the travelling path area, based on a width of the travelling path area, which is calculated depending on a rate determined based on the position of the opposite target.

According to an embodiment, the rate may be determined based on the size of the opposite target.

According to another aspect of the present disclosure, a method for forward collision avoidance assist-junction turning, may include acquiring a steering angle and a yaw rate of a vehicle having a forward collision avoidance assist-junction turning (FCA-JT) function, and a position of an opposite target that is traveling in an opposite direction to the vehicle, and acquiring at least one of a steering angle speed of the vehicle, or a size or a speed of the opposite target, calculating a travelling path area for a left-turn or a right-turn of the vehicle based on the acquired steering angle and the acquired yaw rate, correcting the travelling path area based on at least one of the steering angle, the steering angle speed, or the yaw rate of the vehicle, or the size, the position, or the speed of the opposite target, and outputting a warning against a collision between the vehicle and the opposite target or performing a control operation to prevent the collision, based on the corrected travelling path area and the position of the opposite target.

According to an embodiment, the acquiring of the steering angle and the yaw rate of the vehicle, and the position of an opposite target, and the acquiring of the at least one of the steering angle speed of the vehicle, or the size or the speed of the opposite target may include acquiring the steering angle and the steering angle speed of the vehicle through a steering sensor, and acquiring the yaw rate of the vehicle through the yaw rate sensor.

According to an embodiment, the opposite target may include at least one of an opposite vehicle, a bicycle, or a pedestrian.

According to an embodiment, the correcting of the travelling path area may include correcting the travelling path area, by calculating an area to be removed from the travelling path area based on the steering angle, the steering angle speed, and the yaw rate.

According to an embodiment, the correcting of the travelling path area, by calculating the area to be removed from the travelling path area based on the steering angle, the steering angle speed, and the yaw rate may include calculating a first length and a second length proportional to a sum of a rate of change in the steering angle, a rate of change in the steering angle speed, and a rate of change in the yaw rate, and calculating a right triangle, which serves as an area to be removed, having two sides including a first line segment, which is positioned on a straight line linking a first point to a second point and has the first length and a second segment which is perpendicular to the first line segment, extends in a direction opposite to a forward direction of the vehicle from an inner end of the first line segment, and has the second length, in which the first point is positioned at an end, which is in the forward direction of the vehicle, of an inner boundary line of the travelling path area, and the second point is positioned at an end, which is in the forward direction of the vehicle, of an outer boundary line of the travelling path area, to correct the travelling path area.

According to an embodiment, the correcting of the travelling path area, by calculating the area to be removed from the travelling path area based on the steering angle, the steering angle speed, and the yaw rate may include calculating a first length and a second length proportional to a sum of a rate of change in the steering angle, a rate of change in the steering angle speed, and a rate of change in the yaw rate, which are applied with weights, and calculating a right triangle, which serves as an area to be removed, having two sides including a first line segment, which is positioned on a straight line linking a first point to a second point and has the first length, and a second segment which is perpendicular to the first line segment, extends in a direction opposite to a forward direction of the vehicle from an inner end of the first line segment, and has the second length, in which the first point is positioned at an end, which is in the forward direction of the vehicle, of an inner boundary line of the travelling path area, and the second point is positioned at an end, which is in the forward direction of the vehicle, of an outer boundary line of the travelling path area, to correct the travelling path area.

According to an embodiment, the calculating of the first length and the second length may include calculating the first length and the second length, based on at least one of the speed, the size, or the position of the opposite target.

According to an embodiment, the correcting of the travelling path area may include correcting the travelling path area, based on a width of the travelling path area, which is calculated by adjusting an inner boundary of the travelling path area outward based on at least one of the position of the opposite target, or the steering angle, or the yaw rate.

According to an embodiment, the correcting of the width of the travelling path area by adjusting the inner boundary of the travelling path area outward may include correcting the travelling path area, based on a width of the travelling path area, which is calculated depending on a rate determined based on the position of the opposite target.

According to an embodiment, the rate may be determined based on the size of the opposite target.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
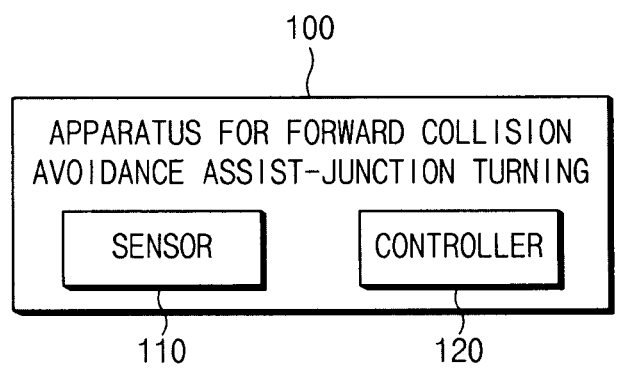
FIG. 1 is a block diagram illustrating an apparatus for forward collision avoidance assist-junction turning, according to an embodiment of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 8.

FIG. 1 is a block diagram illustrating an apparatus for forward collision avoidance assist-junction turning, according to an embodiment of the present disclosure.

Referring to FIG. 1, an apparatus 100 for forward collision avoidance assist-junction turning may be implemented by including a sensor 110 and a controller 120.

For example, the apparatus 100 for forward collision avoidance assist-junction turning may be implemented integrally with a vehicle, and implemented in the form of a component separate from the vehicle and mounted in/attached to the vehicle. A portion of the apparatus 100 for forward collision avoidance assist-junction turning may be implemented integrally with the vehicle, and another portion of the apparatus 100 for forward collision avoidance assist-junction turning may be implemented in the form of a component separate from the vehicle and mounted in/attached to the vehicle.

The sensor 110 may acquire at least one of a steering angle, a steering angle speed, or a yaw rate of the vehicle, or a position, a size, and a speed of an opposite target.

In this case, the opposite target may refer to a target which runs in an opposite direction at a junction (intersection), and may include at least one of an opposite vehicle, a bicycle, and a pedestrian.

The sensor 110 may include a steering angle sensor to acquire the steering angle and the steering angle speed of the vehicle, and a yaw rate sensor to acquire the yaw rate of the vehicle.

For example, the sensor 110 may include a camera to acquire the position, the size, and the speed of the opposite target. In detail, the sensor 110 may acquire the position, the size, and the speed of the opposite vehicle through a surrounding image, which is acquired through the camera, of the vehicle.

For another example, the sensor 110 may include a wireless detection device, such as a radar or LiDAR, to acquire the position, the size, and the speed of the opposite target.

For another example, the sensor 110 may acquire the position, the size, and the speed of the opposite target by making real-time communication with a server or the opposite target having information on the position, the size, and the speed of the opposite target through wireless communication.

The controller 120 may electrically or mechanically perform the overall control operation, such that components of the apparatus 100 for forward collision avoidance assist-junction turning normally perform the intrinsic functions thereof. The controller 120 may electrically or mechanically perform the overall control operation such that components of the apparatus 100 for forward collision avoidance assist-junction turning normally perform the intrinsic functions thereof. In addition, the controller 120 may be implemented in the form of hardware or software, and may be implemented in the form of the combination of the hardware and the software. Preferably, the controller 120 may be implemented with a micro-processor, but the present disclosure is not limited thereto. In addition, the controller 120 may perform various data processes and computations to be described below.

The controller 120 may receive information on the steering angle, the steering angle speed, or the yaw rate of the vehicle, or the position, the size, or the speed of the opposite vehicle, which is obtained through the sensor 110. The controller 120 may be directly or indirectly connected with the sensor 110 in a wireless or wired manner, to receive the information acquired through the sensor 110.

The controller 120 may calculate a travelling path area for a left-turn or a right-turn of the vehicle, based on the steering angle and the yaw rate.

The controller 120 may correct the travelling path area, based on at least one of the steering angle, the steering angle speed, or the yaw rate, or the size, the position, or the speed of the opposite target.

The controller 120 may output a warning against the collision between the opposite vehicle and the vehicle, or may perform a control operation to prevent the collision, based on the corrected travelling path area and the position of the opposite vehicle.

For example, the warning against the collision between the vehicle and the opposite target may be output through an alarm sound, a display, or a message, and the control operation to prevent the collision between the vehicle and the opposite vehicle may be performed through a deceleration control over the vehicle or an acceleration control over the vehicle.

Figure 2:
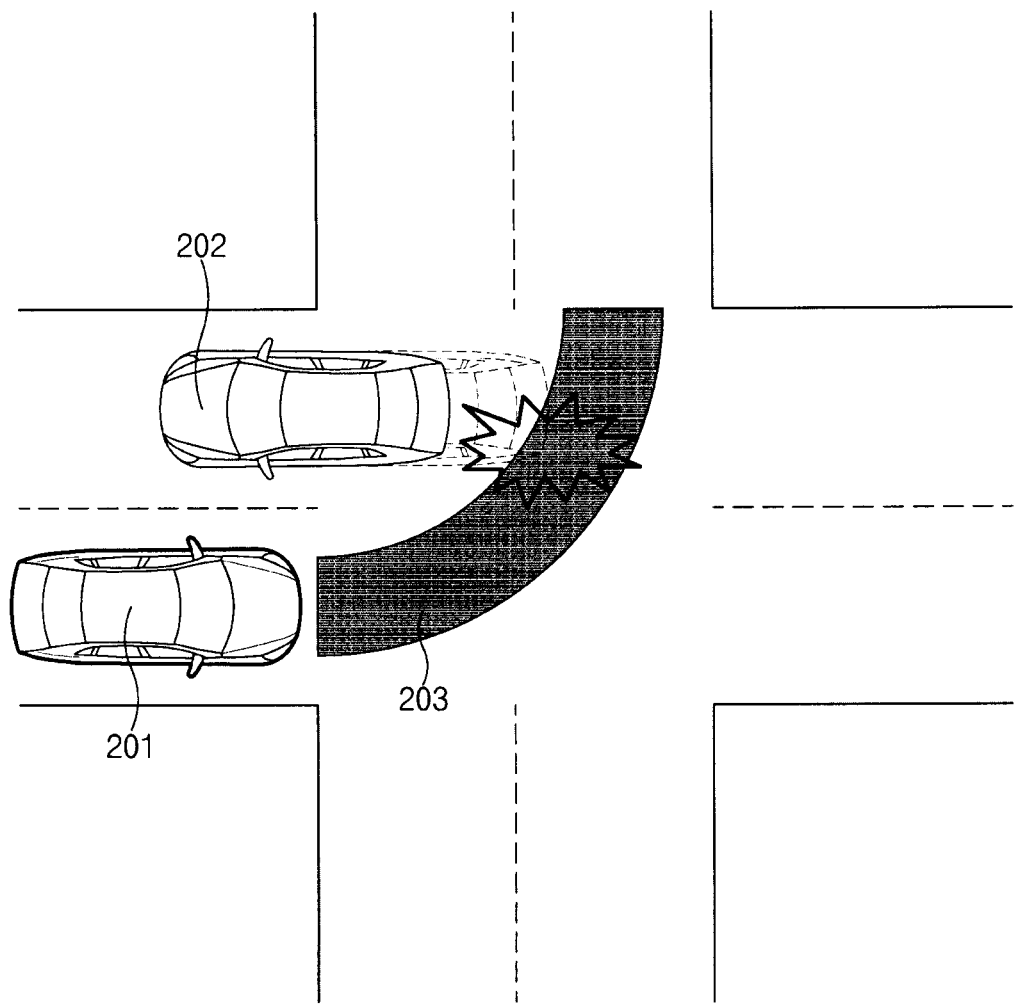
FIG. 2 is a view illustrating a procedure of determining a collision risk with an opposite vehicle at a junction in a conventional apparatus for forward collision avoidance assist-junction turning.

FIG. 2 is a view illustrating a procedure of determining a collision risk with an opposite vehicle at a junction in a conventional apparatus for forward collision avoidance assist-junction turning.

Referring to FIG. 2, it may be assumed that there are present a vehicle 201 attempting to turn left at a junction of a crossroad and an opposite vehicle 202 traveling straight from the opposite side.

Under the situation, the conventional apparatus for forward collision avoidance assist-junction turning may calculate a travelling path area 203. The conventional apparatus 100 for forward collision avoidance assist-junction turning may calculate the travelling path area 203 based on the steering angle and the yaw rate of the vehicle 201.

The conventional apparatus for forward collision avoidance assist-junction turning may sense a collision risk, by determining whether there is present an overlap part between the travelling path area 203 and the opposite vehicle 202.

However, since the opposite vehicle 202 travels straight in a direction opposite to the vehicle 201, the opposite vehicle 202 may deviate from the travelling path area 203 over time.

The conventional apparatus for forward collision avoidance assist-junction turning, which has no function of correcting the travelling path area 203, may determine that there is present a collision risk, even though there is absent the collision risk between the vehicle 201 and the opposite vehicle 202, and may perform the sensitive warning or the sensitive control operation, thereby making a driver bothering.

Accordingly, there is necessary a technology of preventing the sensitive warning or the sensitive control operation by determining the collision risk as being absent or the probability of the collision risk as being low, when the opposite vehicle 202 passes through the travelling path area 203 or has the higher probability of passing through the travelling path area 203, as the opposite vehicle 202 travels forward.

Figure 3:
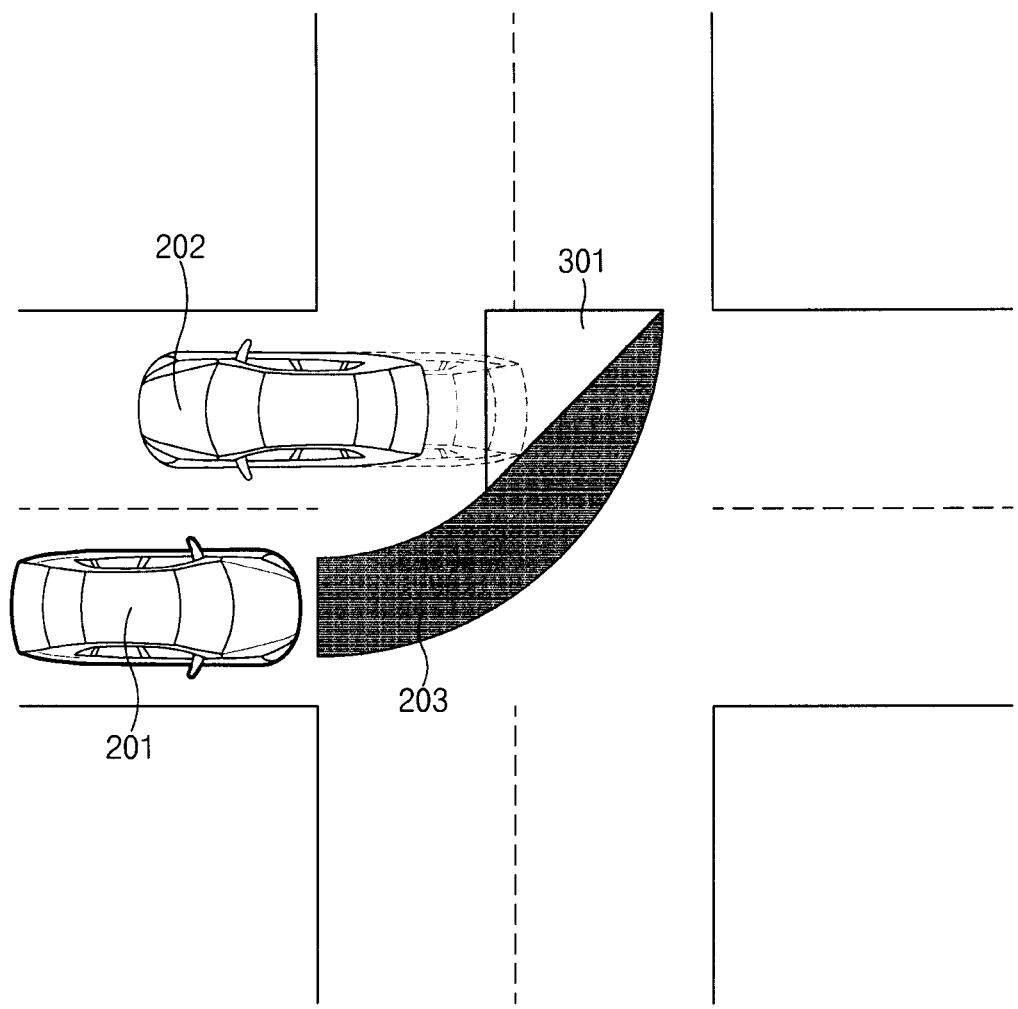
FIG. 3 is a view illustrating the correction of a travelling path area, according to an embodiment of the present disclosure.

FIG. 3 is a view illustrating the correction of a travelling path area, according to an embodiment of the present disclosure.

Referring to FIG. 3, it may be assumed that there are present the vehicle 201 attempting to turn left at a junction of a crossroad and the opposite vehicle 202 traveling straight from the opposite side, which is similar to the situation of FIG. 2.

Although not illustrated in FIG. 3, the present disclosure is not limited to a situation that the vehicle 201 turns left, but a situation that the vehicle turns right may be assumed.

In addition, as illustrated in FIG. 3, the opposite target may be the opposite vehicle 202, but the present disclosure is not limited thereto. For example, the opposite target may be a pedestrian.

The sensor 110 may acquire the steering angle, the steering angle speed, and the yaw rate of the vehicle 201, or may acquire the position, the size, and the speed of the opposite vehicle 202.

The apparatus 100 for forward collision avoidance assist-junction turning may determine whether the vehicle 201 turns left or right at the junction, based on the steering angle, the steering angle speed, or the yaw rate of the vehicle 201.

The apparatus 100 for forward collision avoidance assist-junction turning may calculate the travelling path area 203 with respect to a left-turn or a right-turn of the vehicle 201, based on the steering angle, the steering angle speed, or the yaw rate of the vehicle 201, through the controller 120.

For example, the apparatus 100 for forward collision avoidance assist-junction turning may send information to the driver, by displaying the calculated travelling path area 203 through a display of the vehicle 201, or may use the information for a computation to be described below, without outputting the information on the travelling path area 203.

For example, the apparatus 100 for forward collision avoidance assist-junction turning may calculate the radius of curvature of a travelling path using the steering angle and the yaw rate of the vehicle 201. In addition, the apparatus 100 for forward collision avoidance assist-junction turning may calculate the travelling path area 203 using the calculated radius of curvature.

For example, when the steering angle and the yaw rate of the vehicle 201 have larger values, the apparatus 100 for forward collision avoidance assist-junction turning may calculate the radius of curvature to have a smaller value. When the steering angle and the yaw rate of the vehicle 201 have smaller values, the apparatus 100 may calculate the radius of curvature to have a larger value.

The apparatus 100 for forward collision avoidance assist-junction turning may correct the travelling path area 203 by calculating an area 301 to be removed from the travelling path area 203 based on the steering angle, the steering angle speed, or the yaw rate, through the controller 120.

Hereinafter, the travelling path area 203 will be first described with reference to FIG. 4, to describe a procedure of calculating the area 301 to be removed from the travelling path area 203 in detail.

Figure 4:
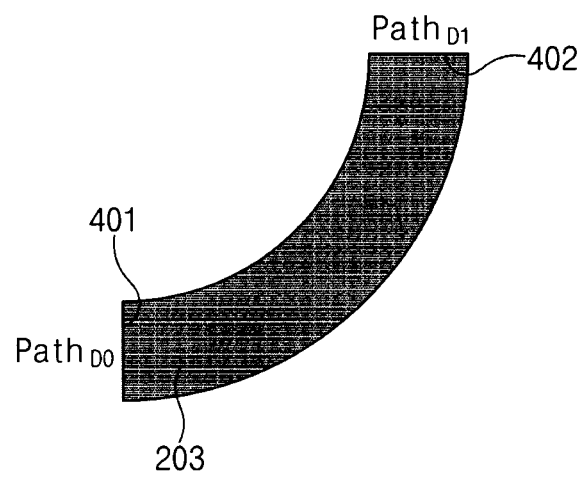
FIG. 4 is a view illustrating a travelling path area, according to an embodiment of the present disclosure.

FIG. 4 is a view illustrating a travelling path area, according to an embodiment of the present disclosure.

The apparatus 100 for forward collision avoidance assist-junction turning may calculate the travelling path area 203 by calculating the radius of curvature of the travelling path area 203, based on the steering angle and the yaw rate of the vehicle 201, through the controller 120.

The apparatus 100 for forward collision avoidance assist-junction turning may calculate the travelling path area 203 based on a path, through which the vehicle 201 passes, during a time taken until the vehicle 201 starts and ends turning left or right.

The width of the travelling path area 203 may be determined based on the width of the vehicle 201.

A boundary line ($Path_{Do}$) 401 of the travelling path area 203 may be a boundary line, which is positioned in a direction opposite to a forward direction of the vehicle 201, of the travelling path area 203. The boundary line ($Path_{Do}$)

401 may be determined based on an area, through which the vehicle 201 passes, when the vehicle 201 starts turning left or right.

A boundary line (Path$_{D1}$) 402 of the travelling path area 203 may be a boundary line, which is positioned in the forward direction of the vehicle 201, of the travelling path area 203. The boundary line (Path$_{D1}$) 402 may be determined based on an area through which the vehicle 201 passes, when the vehicle 201 ends turning left or right.

The apparatus 100 for forward collision avoidance assist-junction turning may set the area 301 to be removed from the travelling path area 203 in a lateral direction/longitudinal direction from the position of the boundary line (Path$_{D1}$) 402.

Hereinafter, a manner of setting the area 301 to be removed from the travelling path area 203 will be described with reference to FIG. 5.

Figure 5:
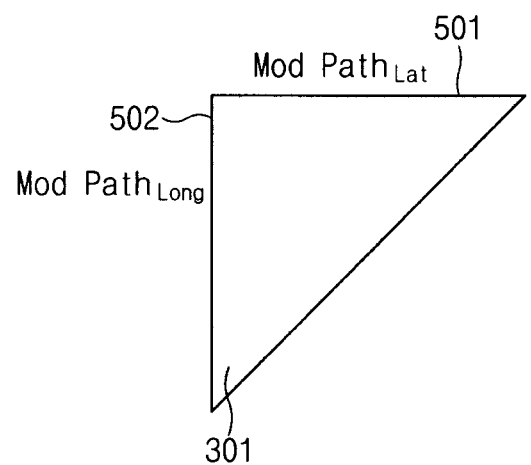
FIG. 5 is a view illustrating an area to be removed from a travelling path area, according to an embodiment of the present disclosure.

FIG. 5 is a view illustrating an area to be removed from the travelling path area, according to an embodiment of the present disclosure.

For example, the apparatus 100 for forward collision avoidance assist-junction turning may determine the area 301 to be removed from the travelling path area 203 as an area having the shape of a right triangle.

The area having the shape of the right triangle may be defined to have a lateral length of Mod Path$_{Lat}$ and a longitudinal length of Mod Path$_{Long}$ at the position of PathD1

The controller 120 may calculate the length of a lateral side 501 and the length of a longitudinal side 502 of the area to be removed in the shape of the right angle, through Equation 1.

$$\text{Mod Path}_{Lat} = ((\text{yawrate} + \text{SAS angle} + \text{SAS Speed}) * \text{Modify}_{Lat\ rate}) * \text{Path}_{width}$$

$$\text{Mod Path}_{Long} = ((\text{yawrate} + \text{SAS angle} + \text{SAS Speed}) * \text{Modify}_{Long\ rate}) * \text{Path}_{length} \quad \text{Equation 1}$$

In Equation 1, 'Mod Path$_{Lat}$' may denote the lateral length of the area to be removed in the shape of the right triangle, 'Yawrate' may denote the rate of change in the yaw rate acquired through the sensor 110, 'SAS angle' may be the rate of change in the steering angle acquired through the sensor 110, 'SAS Speed' may be the rate of change in the steering angle speed acquired through the sensor 110, 'Modify$_{Lat\ rate}$' may denote a correction value of the lateral length, 'Modify$_{Long\ rate}$' may denote a correction value of the longitudinal length, 'Path$_{width}$' may denote the lateral position of the opposite vehicle 202, and 'Path$_{length}$' may denote the longitudinal position of the opposite vehicle 202.

For example, 'Path$_{width}$' and 'Path$_{length}$' may be determined depending on the lateral position and the longitudinal position of the opposite vehicle 202 based on a point positioned at the end of an inner boundary line of the travelling path area 203 in the forward direction of the vehicle 201.

For example, 'Modify$_{Lat\ rate}$' and 'Modify$_{Long\ rate}$' may be values set based on the speed of the opposite vehicle 202. Specifically, 'Modify$_{Lat\ rate}$' and 'Modify$_{Long\ rate}$' may be set to be larger values, as the speed of the opposite vehicle 202 is increased. In this case, the speed of the opposite vehicle 202 may include a relative speed based on the vehicle 201.

For example, 'Modify$_{Lat\ rate}$' and 'Modify$_{Long\ rate}$' may be values set based on the size of the opposite vehicle 202. Specifically, 'Modify$_{Lat\ rate}$' and 'Modify$_{Long\ rate}$' may be set based on the length and width of the opposite vehicle 202.

For example, although Equation 1 states that 'Mod Path$_{Lat}$' and 'Mod Path$_{Long}$' are set in proportion to the sum of the rate of change in the yaw rate, the rate of change in the steering angle, and the rate of change in the steering angle speed, but the present disclosure is not limited thereto. For example, 'Mod Path$_{Lat}$' and 'Mod Path$_{Long}$' may be set in proportion to a sum of the rate of change in the yaw rate, the rate of change in the steering angle, and the rate of change in the steering angle speed, which are applied with weights.

Figure 6A:
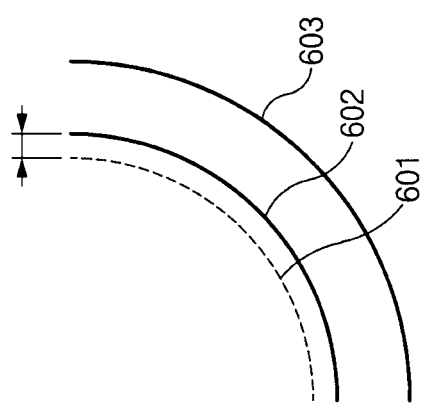
FIGS. 6A and 6B are views illustrating the correction of a travelling path area, according to another embodiment of the present disclosure.
Figure 6B:
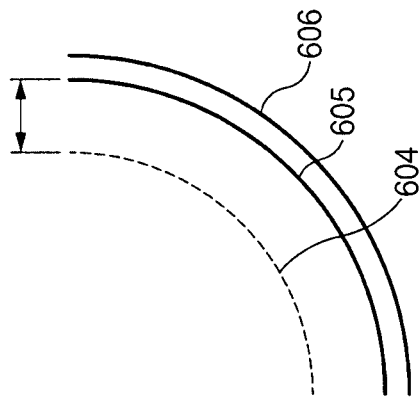

FIGS. 6A and 6B are views illustrating the correction of a travelling path area, according to another embodiment of the present disclosure.

The apparatus 100 for forward collision avoidance assist-junction turning may correct the travelling path area 203 by adjusting the boundary line of the travelling path area 203 without setting the area 301 to be removed from the travelling path area 203.

For example, the controller 120 may correct the travelling path area 203 based on the width of the travelling path area 203, which is calculated by adjusting an inner boundary of the travelling path area 203 outward, based on at least one of the speed or the position of the opposite vehicle 202, or the steering angle or the yaw rate of the vehicle 201.

For example, the controller 120 may correct the travelling path area 203 based on the width of the travelling path area 203, which is calculated based on a rate determined depending on the position of the opposite vehicle 202.

The rate determined depending on the position of the opposite vehicle 202 may be a value referring to the ratio of a width of the travelling path area 203, which is formed after correction, with respect to a width of the travelling path area 203 which is formed before the correction.

Referring to FIGS. 6A and 6B, when the steering angle or the yaw rate of the vehicle 201 has a larger value, an inner boundary 601 of the travelling path area 203 is more slightly adjusted outward. When the steering angle or the yaw rate of the vehicle 201 has a smaller value, the inner boundary 604 of the travelling path area 203 may be more largely adjusted outward.

When the steering angle or the yaw rate of the vehicle 201 has a larger value, since the vehicle 201 has the higher probability of colliding with the opposite vehicle 202, the travelling path area 203 may be more slightly adjusted. When the steering angle or the yaw rate of the vehicle 201 has a smaller value, since the vehicle 201 has the lower probability of colliding with the opposite vehicle 202, the travelling path area 203 may be more largely adjusted.

In detail, when the steering angle or the yaw rate of the vehicle 201 has a larger value, the travelling path area 203 may be corrected based on an after-correction inner boundary 602 of the travelling path area 203, which is obtained by more slightly adjusting a before-correction inner boundary 601 of the travelling path area 203 outward. In this case, an outer boundary 603 of the travelling path area 203 may be maintained to be a value formed before correction without being adjusted.

When the steering angle or the yaw rate of the vehicle 201 has a smaller value, the travelling path area 203 may be corrected based on an after-correction inner boundary 605 of the travelling path area 203, which is obtained by more largely adjusting a before-correction inner boundary 604 of the travelling path area 203 outward. In this case, an outer boundary 606 of the travelling path area 203 may be maintained to be a value formed before correction without being adjusted.

For example, the rate determined depending on the position of the opposite vehicle 202 may be determined through a table previously stored in a memory as shown in following table 1.

TABLE 1

| Lateral position [m] | Width Rate [%] |
|---|---|
| 1.8 | 0 |
| 1.2 | 50 |
| 0.6 | 70 |
| 0 | 100 |

In this case, "Lateral position" may be a value indicating the lateral position of the opposite vehicle 202, and the term "Width Rate" may be a rate determined depending on the lateral position. In addition, in table 1, although the rate determined depending on the lateral position of the opposite vehicle 202 is provided for the illustrative purpose, the present disclosure is not limited thereto. For example, a table including a longitudinal position together may be used.

The controller 120 may correct the travelling path area 203 by correcting a value, which is determined by multiplying the width of the travelling path area 203 by the rate, and employing the corrected value as the width of the travelling path area 203, thereby correcting the travelling path area 203.

For example, the rate determined depending on the position of the opposite vehicle 202 may be determined based on the size of the opposite vehicle 202. In detail, the rate determined depending on the position of the opposite vehicle 202 may be determined based on the length and the width of the opposite vehicle 202.

Figure 7:
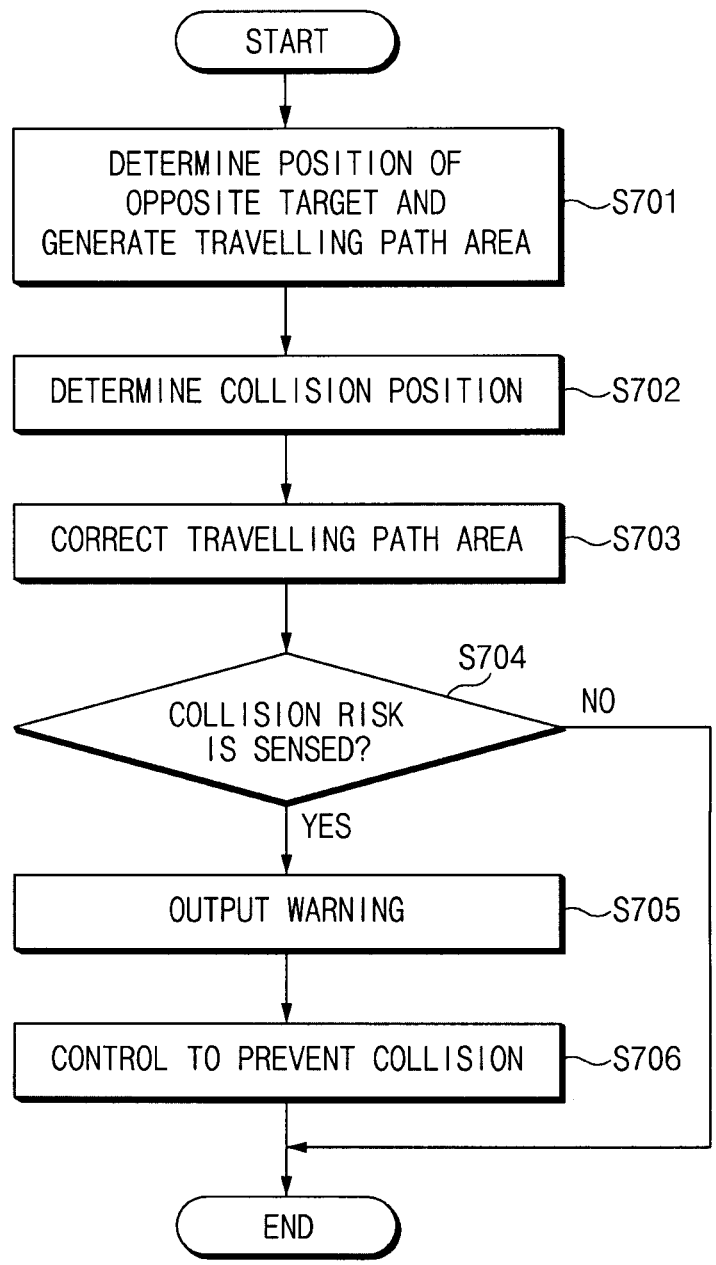
FIG. 7 is a flowchart illustrating a method for forward collision avoidance assist-junction turning, according to an embodiment of the present disclosure.

FIG. 7 is a flowchart illustrating a method for forward collision avoidance assist-junction turning, according to an embodiment of the present disclosure.

First, the apparatus 100 for forward collision avoidance assist-junction turning may determine the position of the opposite target and may generate the travelling path area of a host vehicle (S701).

For example, the apparatus 100 for forward collision avoidance assist-junction turning may determine the position of the opposite target by using information on an image on an opposite target obtained through the sensor 110. In addition, the apparatus 100 for forward collision avoidance assist-junction turning may generate the travelling path area 203 by using at least one of the steering angle, the steering angle speed, or the yaw rate of the vehicle 201 acquired through the sensor 110.

The apparatus 100 for forward collision avoidance assist-junction turning may determine a collision position (S702) after determining the position of the opposite target and generating the travelling path area 203.

For example, the apparatus 100 for forward collision avoidance assist-junction turning may determine the collision position, based on the generated travelling path area 203 and the position of the opposite target.

The apparatus 100 for forward collision avoidance assist-junction turning may correct the travelling path area 203 after determining the collision position (S703).

The travelling path area 203 may correct the travelling path area 203, based on at least one the position, the speed, or the size of the opposite target, or the steering angle, the steering angle speed, or the yaw rate of the host vehicle.

For example, the apparatus 100 for forward collision avoidance assist-junction turning may correct the travelling path area 203 by calculating an area, which has no collision risk, to be removed from the travelling path area 203, or may correct the travelling path area 203 by adjusting an inner boundary portion of the travelling path area 203 outward.

The determined position of the opposite target and the generated travelling path area 203 are calculated based on information acquired through the sensor 110. Accordingly, since the sensor 110 may have an error, the temporal difference between the sensed information and the real situation may be made due to the movement of the vehicle 201 or the opposite target. Accordingly, the travelling path area 203 needs to be corrected.

The apparatus 100 for forward collision avoidance assist-junction turning may determine whether the collision risk is sensed (S704), after correcting the travelling path area 203.

For example, the apparatus 100 for forward collision avoidance assist-junction turning may determine whether the collision risk is sensed, based on whether there is present an overlap part between the corrected travelling path area 203 and the opposite target.

The apparatus 100 for forward collision avoidance assist-junction turning may output a warning when the collision risk is sensed (S705).

The apparatus 100 for forward collision avoidance assist-junction turning may perform a control operation to prevent collision, after outputting the warning (S706).

The apparatus 100 for forward collision avoidance assist-junction turning may perform a control operation to decelerate or stop a vehicle such that the collision is prevented, when the collision risk is sensed.

Although not illustrated, when the collision risk is sensed, after performing the control operation to prevent the collision (S706), the warning may be output (S705). Alternatively, the control operation to prevent the collision may be performed while outputting the warning.

Figure 8:
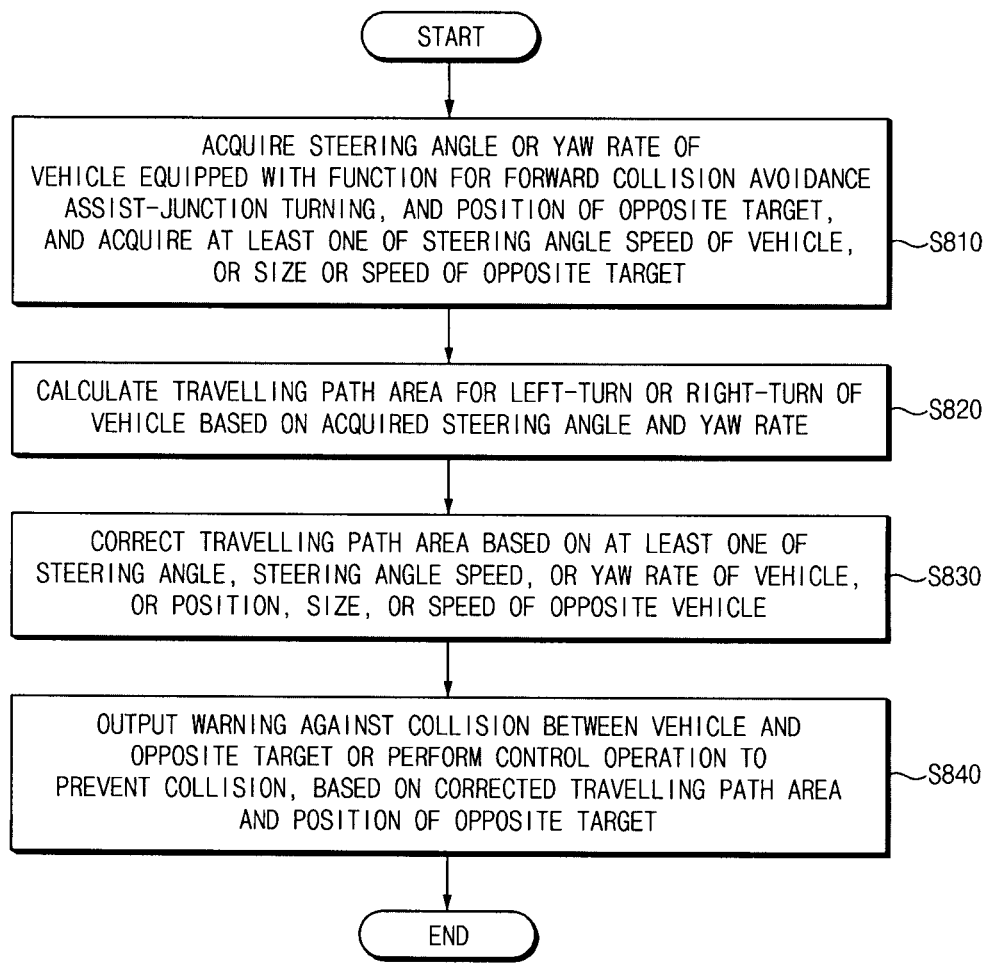
FIG. 8 is a flowchart illustrating a method for forward collision avoidance assist-junction turning, according to another embodiment of the present disclosure.

FIG. 8 is a flowchart illustrating a method for forward collision avoidance assist-junction turning, according to another embodiment of the present disclosure.

Referring to FIG. 8, the method for forward collision avoidance assist-junction turning includes acquiring a steering angle or a yaw rate of a vehicle equipped with a function for forward collision avoidance assist-junction turning, and a position of an opposite target, and acquiring at least one of a steering angle speed of the vehicle, or the size or the speed of the opposite target (S810), calculating a travelling path area for a left-turn or a right-turn of the vehicle based on the acquired steering angle and yaw rate (S820), correcting the travelling path area based on at least one of the steering angle, the steering angle speed, or the yaw rate of the vehicle, or the position, the size, or the speed of the opposite vehicle (S830), and outputting a warning against collision between the vehicle and the opposite target or performing a control operation to prevent the collision, based on the corrected travelling path area and the position of the opposite target (S840).

The acquiring the steering angle or the yaw rate of the vehicle, or the position of an opposite target, and acquiring the at least one of the steering angle speed of the vehicle, or the size or the speed of the opposite target (S810) may include acquiring the steering angle and the steering angle speed of the vehicle through the steering angle sensor, and acquiring the yaw rate of the vehicle through the yaw rate sensor.

For example, the correcting of the travelling path (S830) may include correcting the travelling path area 203, by calculating an area to be removed from the travelling path area 203 based on the steering angle, the steering angle speed, and the yaw rate.

For example, the correcting of the travelling path area 203, by calculating the area to be removed from the travelling path area 203 based on the steering angle, the steering angle speed, and the yaw rate may include: calculating a first length and a second length in proportional to the sum of the rate of change in the steering angle, the rate of change in the steering angle speed, and the rate of change in the yaw rate; and correcting the travelling path area 203, by calculating a right triangle, which serves as the area to be removed, having two sides including a first line segment, which is positioned on a straight line linking a first point to a second point and has the first length, and a second segment which is perpendicular to the first line segment, extends in a direction opposite to a forward direction of the vehicle from an inner end of the first line segment, and has the second length, in which the first point is positioned at an end, which is in the forward direction of the vehicle, of an inner boundary line of the travelling path area 203, and the second point is positioned at an end, which is in the forward direction of the vehicle, of an outer boundary line of the travelling path area 203.

For another example, the correcting of the travelling path (S830) may include correcting the travelling path area 203 based on a width of the travelling path area 203, which is calculated by adjusting an inner boundary of the travelling path area 203 outward based on at least one of the steering angle or the yaw rate of the vehicle 201.

For example, the correcting the width of the travelling path area 203 by adjusting the inner boundary of the travelling path area 203 outward may include correcting the travelling path area 203 based on the width of the travelling path area 203 calculated depending on the rate determined based on the position of the opposite target.

As described above, according to the present disclosure, the apparatus for forward collision avoidance assist-junction turning and the method for the same have the following effects.

At least one of embodiments of the present disclosure may provide the apparatus for forward collision avoidance assist-junction turning, capable of reducing the sensitive warning or the sensitive control operation by correcting a travelling path area, and the method for the same.

In addition, at least one of embodiments of the present disclosure may provide the apparatus for forward collision avoidance assist-junction turning, capable of more exactly sensing the collision risk, based on the speed, the position, and the size of the opposite vehicle, and the method for the same.

In addition, at least one of embodiments of the present disclosure may provide the apparatus for forward collision avoidance assist-junction turning, capable of more exactly sensing a collision risk by correcting the travelling path area, based on the steering angle, the steering angle speed, and the yaw rate of a vehicle, and the method for the same.

At least one of embodiments of the present disclosure may provide the apparatus for forward collision avoidance assist-junction turning, capable of issuing the warning or performing the control operation to prevent the accident of a driver, by more exactly sensing the collision risk of the opposite vehicle, and the method for the same.

Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for forward collision avoidance assist-junction turning of a vehicle, the apparatus comprising:
a controller configured to:
acquire, using at least one sensor, a steering angle and a yaw rate of the vehicle having a forward collision avoidance assist-junction turning (FCA-JT) function, and a position of an opposite target that is traveling in an opposite direction to the vehicle;
acquire, using the at least one sensor, at least one of a steering angle speed of the vehicle, or a size or a speed of the opposite target;
calculate a travelling path area for a left-turn or a right-turn of the vehicle based on the acquired steering angle and the acquired yaw rate;
correct the travelling path area based on at least one of the steering angle, the steering angle speed or the yaw rate of the vehicle, or the size, the position or the speed of the opposite target; and
output a warning against a collision between the vehicle and the opposite target or perform a control operation to prevent the collision, based on the corrected travelling path area and the position of the opposite target,
wherein the controller is further configured to:
correct the travelling path area, by calculating an area to be removed from the travelling path area based on the steering angle, the steering angle speed, and the yaw rate of the vehicle;
calcuate a first length and a second length, wherei the first length and the second length are proportional to a sum of a rate of change in the steering angle, a rate of change in the steering angle speed, and a rate of change in the yaw rate of the vehicle; and
calculate a right triangle, which serves as the area to be removed, having two sides including a first line segment, which is positioned on a straight line linking a first point to a second point and has the first length, and a second line segment, which is perpendicular to the first line segment, extends in a direction opposite to a forward direction of the vehicle from an inner end of the first line segment, and has the second length, and
wherein the first point is positioned at an end, which is in the forward direction of the vehicle, of an inner boundary line of the travelling path area, and the second point is positioned at an end, which is in the forward direction of the vehicle, of an outer boundary line of the travelling path area, to correct the travelling path.

2. The apparatus of claim 1, wherein the at least one sensor includes:
a steering angle sensor configured to acquire the steering angle and the steering angle speed of the vehicle; and
a yaw rate sensor configured to acquire the yaw rate of the vehicle.

3. The apparatus of claim 1, wherein the opposite target includes at least one of an opposite vehicle, a bicycle, or a pedestrian.

4. The apparatus of claim 1, wherein the controller is further configured to:
calculate the first length and the second length, wherein the first length and the second length are proportional to the sum of the rate of change in the steering angle, the rate of change in the steering angle speed, and the rate of change in the yaw rate of the vehicle, which are applied with weights.

5. The apparatus of claim 1, wherein the controller is further configured to calculate the first length and the second length, based on at least one of the speed, the size, or the position of the opposite target.

6. The apparatus of claim 1, wherein the controller is further configured to correct the travelling path area, based on a width of the travelling path area, which is calculated by adjusting the inner boundary of the travelling path area outward based on at least one of the speed of the position of the opposite target or the steering angle of the vehicle, or the yaw rate of the vehicle.

7. The apparatus of claim 1, wherein the controller is further configured to:
correct the travelling path area, based on a width of the travelling path area, which is calculated depending on a rate determined based on the position of the opposite target,
wherein the rate determined based on the position of the opposite target is a value referring to a ratio of a first width of the travelling path area, which is formed after the correction, with respect to a second width of the travelling path area which is formed before the correction.

8. The apparatus of claim 7, wherein the rate is determined further based on the size of the opposite target.

9. A method for forward collision avoidance assist-junction turning of a vehicle, the method comprising:
acquiring a steering angle and a yaw rate of the vehicle having a forward collision avoidance assist-junction turning (FCA-JT) function, and a position of an opposite target that is traveling in an opposite direction to the vehicle, and acquiring at least one of a steering angle speed of the vehicle, or a size or a speed of the opposite target;
calculating a travelling path area for a left-turn or a right-turn of the vehicle based on the acquired steering angle and the acquired yaw rate;
correcting the travelling path area based on at least one of the steering angle, the steering angle speed, or the yaw rate of the vehicle, or the size, the position, or the speed of the opposite target; and
outputting a warning against a collision between the vehicle and the opposite target or performing a control operation to prevent the collision, based on the corrected travelling path area and the position of the opposite target,
wherein the method is further comprising:
correcting the travelling path area, by calculating an area to be removed from the travelling path area based on the steering angle, the steering angle speed, and the yaw rate of the vehicle;
calculating a first length and a second length, wherein the first length and the second length are proportional to a sum of a rate of change in the steering angle, a rate of change in the steering angle speed, and a rate of change in the yaw rate of the vehicle; and
calculating a right triangle, which serves as the area to be removed, having two sides including a first line segment, which is positioned on a straight line linking a first point to a second point and has the first length, and a second line segment which is perpendicular to the first line segment, extends in adirection opposite to a forward direction of the vehicle from an inner end of the first line segment, and has the second length, and
wherein the first point is positioned at an end, which is in the forward direction of the vehicle, of an inner boundary line of the travelling path area, and the second point is positioned at an end, which is in the forward direction of the vehicle, of an outer boundary line of the travelling path area, to correct the travelling path area.

10. The method of claim 9, wherein the acquiring of the steering angle and the yaw rate of the vehicle, and the position of the opposite target, and the acquiring of the at least one of the steering angle speed of the vehicle, or the size or the speed of the opposite target includes:
acquiring the steering angle and the steering angle speed of the vehicle through a steering sensor; and
acquiring the yaw rate of the vehicle through the yaw rate sensor.

11. The method of claim 9, wherein the opposite target includes at least one of an opposite vehicle, a bicycle, or a pedestrian.

12. The method of claim 9, wherein the correcting of the travelling path area, by calculating the area to be removed from the travelling path area based on the steering angle, the steering angle speed, and the yaw rate of the vehicle includes:
calculating the first length and the second length, wherein the first length and the second length are proportional to the sum of the rate of change in the steering angle, the rate of change in the steering angle speed, and the rate of change in the yaw rate of the vehicle, which are applied with weights.

13. The method of claim 9, wherein the calculating of the first length and the second length includes calculating the first length and the second length, based on at least one of the speed, the size, or the position of the opposite target.

14. The method of claim 9, wherein the correcting of the travelling path area includes:
correcting the travelling path area, based on a width of the travelling path area, which is calculated by adjusting the inner boundary of the travelling path area outward based on at least one of the position of the opposite target, or the steering angle, or the yaw rate.

15. The method of claim 14, wherein the correcting of the width of the travelling path area by adjusting the inner boundary of the travelling path area outward includes:
correcting the travelling path area, based on the width of the travelling path area, which is calculated depending on a rate determined based on the position of the opposite target,
wherein the rate determined based on the position of the opposite target is a value referring to a ratio of a first width of the travelling path area, which is formed after the correction, with respect to a second width of the travelling path area which is formed before the correction.

16. The method of claim 15, wherein the rate determined based on the position of the opposite target is determined further based on the size of the opposite target.

* * * * *